US007112614B2

(12) United States Patent
Jing et al.

(10) Patent No.: US 7,112,614 B2
(45) Date of Patent: *Sep. 26, 2006

(54) CROSSLINKED POLYMER

(75) Inventors: Naiyong Jing, Woodbury, MN (US); Steven J. Hamrock, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/730,238

(22) Filed: Dec. 8, 2003

(65) Prior Publication Data

US 2005/0131096 A1 Jun. 16, 2005

(51) Int. Cl.
C08J 5/22 (2006.01)
C08J 5/20 (2006.01)
C08F 2/46 (2006.01)

(52) U.S. Cl. .............. 521/27; 521/25; 521/30; 521/31; 522/1; 522/2; 522/150; 522/155; 522/156; 522/184; 522/185; 522/186; 522/187; 522/188; 522/189

(58) Field of Classification Search ............ 522/1, 522/2, 150, 155, 156, 184, 185, 186, 187, 522/188, 189; 521/25, 27, 30, 31
See application file for complete search history.

(56) References Cited

U.S. PATENT DOCUMENTS

| 3,282,875 A | 11/1966 | Connolly et al. |
| 3,635,926 A | 1/1972 | Gresham et al. |
| 3,784,399 A | 1/1974 | Grot |
| 3,853,828 A | 12/1974 | Wall et al. |
| 4,000,356 A | 12/1976 | Weisgerber et al. |
| 4,073,752 A | 2/1978 | Ramp |
| 4,169,023 A | 9/1979 | Sata et al. |
| 4,214,060 A | 7/1980 | Apotheker et al. |
| 4,218,542 A | 8/1980 | Ukihashi et al. |
| 4,230,549 A | 10/1980 | D'Agostino et al. |
| 4,242,498 A | 12/1980 | Frosch et al. |
| 4,268,650 A | 5/1981 | Rose |
| 4,281,092 A | 7/1981 | Breazeale |
| 4,330,654 A | 5/1982 | Ezzell et al. |
| 4,334,082 A | 6/1982 | Resnick |
| 4,391,844 A | 7/1983 | Baczek et al. |
| 4,414,159 A | 11/1983 | Resnick |
| 4,440,917 A | 4/1984 | Resnick |
| 4,454,247 A | 6/1984 | Resnick |
| 4,470,889 A | 9/1984 | Ezzell et al. |
| 4,508,603 A | 4/1985 | Ukihashi et al. |
| 4,522,952 A | 6/1985 | Klein et al. |
| 4,602,045 A | 7/1986 | Markus et al. |
| 4,686,024 A | 8/1987 | Scherer, Jr. et al. |
| 4,734,474 A | 3/1988 | Hamada et al. |
| 4,743,419 A | 5/1988 | Bierschenk |
| 4,755,567 A | 7/1988 | Bierschenk et al. |
| 4,981,932 A | 1/1991 | Blaise et al. |
| 5,260,351 A | 11/1993 | Logothetis |
| 5,264,508 A | 11/1993 | Ishibe et al. |
| 5,330,626 A | 7/1994 | Banerjee |
| 5,466,930 A | 11/1995 | Schlenoff |
| 5,527,861 A | 6/1996 | Logothetis |
| 5,608,022 A | 3/1997 | Nakayama et al. |
| 5,693,748 A | 12/1997 | Ikeda et al. |
| 5,795,496 A | 8/1998 | Yen et al. |
| 5,798,417 A | 8/1998 | Howard, Jr. |
| 5,804,650 A | 9/1998 | Tsuda et al. |
| 5,852,148 A | 12/1998 | Behr et al. |
| 5,986,012 A | 11/1999 | Legare et al. |
| 6,011,074 A | 1/2000 | Sorenson et al. |
| 6,090,895 A | 7/2000 | Mao et al. |
| 6,224,994 B1 | 5/2001 | Asukabe et al. |
| 6,225,368 B1 | 5/2001 | D'Agostino et al. |
| 6,242,123 B1 | 6/2001 | Nezu et al. |
| 6,248,469 B1 | 6/2001 | Formato et al. |
| 6,254,978 B1 | 7/2001 | Bahar et al. |
| 6,255,370 B1 | 7/2001 | Vizcaino et al. |
| RE37,307 E | 8/2001 | Bahar et al. |

(Continued)

FOREIGN PATENT DOCUMENTS

DE   26 24 203   12/1976

(Continued)

OTHER PUBLICATIONS

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

(Continued)

Primary Examiner—Sanza L. McClendon
(74) Attorney, Agent, or Firm—Philip Y. Dahl

(57) ABSTRACT

A method is provided for obtaining crosslinked polymers, particularly fluorinated polymers having pendent sulfonic acid groups, by crosslinking through pendent groups which include a sulfonyl chloride group ($-SO_2Cl$). The sulfonyl chloride group may be removed by application of electromagnetic radiation, typically in the ultraviolet band, or a radical initiator, leaving behind a radical which readily binds covalently to other polymer strands or to crosslinking agents to form crosslinks. Typically, the polymer is made by providing a polymer comprising pendent groups which include a group according to the formula $-SO_2F$ and converting at least a portion of the $-SO_2F$ groups to $-SO_2Cl$. After crosslinking, the remaining $-SO_2F$ groups may be converted to sulfonic acid groups, yielding a crosslinked polymer electrolyte. Such crosslinked polymer electrolytes may be used to make polymer electrolyte membranes (PEM's) that may be used in electrolytic cells such as fuel cells.

4 Claims, No Drawings

U.S. PATENT DOCUMENTS

| | | |
|---|---|---|
| 6,274,677 B1 | 8/2001 | Tatemoto |
| 6,277,512 B1 | 8/2001 | Hamrock et al. |
| 6,355,370 B1 | 3/2002 | Katoh et al. |
| RE37,656 E | 4/2002 | Bahar et al. |
| 6,365,769 B1 | 4/2002 | Behr et al. |
| 6,380,337 B1 | 4/2002 | Abe et al. |
| RE37,701 E | 5/2002 | Bahar et al. |
| 6,387,964 B1 | 5/2002 | D'Agostino et al. |
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1 | 12/2002 | Cheng |
| 6,503,378 B1 | 1/2003 | Fisher |
| 6,552,135 B1 | 4/2003 | Schnurnberger et al. |
| 6,624,328 B1 | 9/2003 | Guerra |
| 6,649,703 B1 | 11/2003 | Michot et al. |
| 6,667,377 B1 | 12/2003 | Feiring et al. |
| 6,670,424 B1 | 12/2003 | Michot et al. |
| 6,872,781 B1 | 3/2005 | Hedhli et al. |
| 2002/0014405 A1 | 2/2002 | Arcella et al. |
| 2002/0040106 A1 | 4/2002 | Wlassics et al. |
| 2003/0032739 A1 | 2/2003 | Kerres et al. |
| 2003/0092940 A1 | 5/2003 | Hamrock |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0241518 A1 | 12/2004 | Yang |
| 2005/0096442 A1 | 5/2005 | Thaler et al. |
| 2005/0107488 A1* | 5/2005 | Yandrasits et al. .......... 522/156 |
| 2005/0107489 A1 | 5/2005 | Yandrasits et al. |
| 2005/0107490 A1* | 5/2005 | Yandrasits et al. .......... 522/156 |
| 2005/0107532 A1 | 5/2005 | Guerra et al. |
| 2005/0113528 A1 | 5/2005 | Jing et al. |
| 2005/0131097 A1 | 6/2005 | Jing et al. |
| 2005/0137351 A1 | 6/2005 | Guerra |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 0 407 937 | 1/1991 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 238 999 A1 | 9/2002 |
| EP | 1 359 142 A1 | 11/2003 |
| FR | 2 387 260 | 12/1976 |
| GB | 1184321 | 3/1970 |
| JP | 53-29291 | 3/1978 |
| JP | 53-97988 | 8/1978 |
| JP | 53-134088 | 11/1978 |
| JP | 54-52690 | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO 94/03503 | 2/1994 |
| WO | WO 97/17381 | 5/1997 |
| WO | WO 99/38897 | 8/1999 |
| WO | WO 00/52060 | 9/2000 |
| WO | WO 01/27167 A1 | 4/2001 |
| WO | WO 01/87992 A2 | 11/2001 |
| WO | WO 01/96268 A2 | 12/2001 |
| WO | WO 02/50142 A1 | 6/2002 |
| WO | WO 02/062749 A1 | 8/2002 |
| WO | WO 02/087001 A2 | 10/2002 |
| WO | WO 02/103834 A1 | 12/2002 |
| WO | WO 03/004463 A1 | 1/2003 |
| WO | WO 03/022892 A2 | 3/2003 |

OTHER PUBLICATIONS

U.S. Appl. No. 10/325,278, filed Dec. 19, 2002; Polymer Electrolyte Membrane.

U.S. Appl. No. 10/697,768, filed Oct. 30, 2003; Aqueous Emulsion Polymerization of Functionalized Fluoromonomers.

Kirk-Othmer, *Encyclopedia of Chemical Technology*, 3d ed., vol. 10, (1980), pp. 840-855.

* cited by examiner

CROSSLINKED POLYMER

FIELD OF THE INVENTION

This invention relates to a method of obtaining crosslinked polymers, particularly fluorinated polymers having pendent sulfonic acid groups, by crosslinking through pendent groups which include a sulfonyl chloride group (—SO$_2$Cl).

BACKGROUND OF THE INVENTION

Copolymers of tetrafluoroethylene (TFE) and a co-monomer according to the formula: FSO$_2$—CF$_2$—CF$_2$—O—CF (CF$_3$)—CF$_2$—O—CF=CF$_2$ are known and sold in sulfonic acid form, i.e., with the FSO$_2$— end group hydrolyzed to HSO$_3$—, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: FSO$_2$—CF$_2$—CF$_2$—O—CF=CF$_2$ are known and used in sulfonic acid form, i.e., with the FSO$_2$— end group hydrolyzed to HSO$_3$—, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendent groups according to the formula:

YOSO$_2$-CF$_2$—CF$_2$-CF$_2$-CF$_2$-O- [polymer backbone]

where Y is H$^+$ or a monovalent cation such as an alkali metal cation. Typically, the membrane is a cast membrane. Typically, the polymer has a hydration product of greater than 22,000. Typically, the polymer has an equivalent weight of 800–1200.

SUMMARY OF THE INVENTION

The present invention provides methods of making crosslinked polymers comprising the steps of: a) providing a polymer comprising first pendent groups which include a group according to the formula —SO$_2$Cl; and b) crosslinking said polymer. The crosslinking step typically comprises exposure to electromagnetic radiation, typically in the ultraviolet band, or exposure to a radical initiator. The first pendent group is typically according to the formula: —R$^1$—SO$_2$Cl, wherein R$^1$ may be straight-chain, branched, cyclic, heteroatomic, polymeric, halogenated, fluorinated or substituted. R$^1$ is typically an aliphatic linking group containing 1–20 carbon or oxygen atoms, more typically R$^1$ is —O—R$^{12}$—, where R$^{12}$ is a branched or unbranched perfluoroalkyl or perfluoroether group comprising 1–15 carbon atoms and 0–4 oxygen atoms, typically —O—CF$_2$—CF (CF$_3$)—O—CF$_2$—CF$_2$— or more typically —O—(CF$_2$)$_4$—. The polymer typically comprises second pendent groups which include a group according to the formula —SO$_2$X', wherein each X' is independently selected from the group consisting of F and —OH, which second pendent groups are typically according to the formula: —R$^1$—SO$_2$F, where R$^1$ is as described above. The polymer is typically fluorinated, more typically highly fluorinated, and most typically perfluorinated. Optionally, the polymer may be formed into a membrane prior to crosslinking, typically having a thickness of 90 microns or less. Optionally, this step of membrane formation may include imbibing said mixture into a porous supporting matrix, typically a porous polytetrafluoroethylene web. Optionally, the polymer may be brought into contact with a crosslinking agent prior to crosslinking, such as a polyaromatic species or a polyvinyl species. Typically, the crosslinking step is followed by a step of converting any remaining groups according to the formula —SO$_2$X' to sulfonic acid groups. The resulting polymer typically has an equivalent weight of less than 1200. The polymer may be made by providing a polymer comprising pendent groups which include a group according to the formula —SO$_2$X and converting at least a portion of the —SO$_2$X groups to —SO$_2$Cl.

In another aspect, the present invention provides crosslinked polymers or membranes made according to the methods of the present invention.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more; and "substituted" means, for a chemical species, substituted by conventional substituents which do not interfere with the desired product or process, e.g., substituents can be alkyl, alkoxy, aryl, phenyl, halo (F, Cl, Br, I), cyano, nitro, etc.

DETAILED DESCRIPTION

Briefly, the present invention provides a method of obtaining crosslinked polymers, particularly fluorinated polymers having pendent sulfonic acid groups, by crosslinking through pendent groups which include a sulfonyl chloride group (—SO$_2$Cl). The sulfonyl chloride group may be removed by application of electromagnetic radiation, typically in the ultraviolet band, or a radical initiator, leaving behind a radical which readily binds covalently to other polymer strands or to crosslinking agents to form crosslinks. Typically, the polymer is made by providing a polymer comprising pendent groups which include a group according to the formula —SO$_2$F and converting at least a portion of the —SO$_2$F groups to —SO$_2$Cl. After crosslinking, the remaining —SO$_2$F groups may be converted to sulfonic acid groups, yielding a crosslinked polymer electrolyte. Polymer electrolytes are typically fluorinated but may also be non-fluorinated. Such crosslinked polymer electrolytes may be used to make polymer electrolyte membranes (PEM's) that may be used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes H$^+$ ions readily.

The polymer to be crosslinked is typically fluorinated, more typically highly fluorinated, and most typically perfluorinated, but may also be non-fluorinated. The polymer to be crosslinked comprises a backbone, which may be branched or unbranched but is typically unbranched. The backbone is optionally fluorinated, typically highly fluorinated, and more typically perfluorinated. The polymer comprises first pendent groups that include sulfonyl chloride groups, typically according to the formula: $-R^1-SO_2Cl$, wherein $R^1$ may be straight-chain, branched, cyclic, heteroatomic, polymeric, halogenated, fluorinated or substituted. $R^1$ is typically an aliphatic linking group containing 1–20 carbon or oxygen atoms. The polymer may also comprise second pendent groups that include sulfonyl fluoride or sulfonic acid groups, typically according to the formula: $-R^1-SO_2X'$, where $X'$ is F or OH and $R^1$ is as above. Each $R^1$ may be selected independently, but more typically, substantially all $R^1$ groups are identical. The backbone may comprise units derived from tetrafluoroethylene (TFE), i.e., typically $-CF_2-CF_2-$ units, and units derived from co-monomers, typically including at least one according to the formula $CF_2=CY-R^{10}$ where Y is typically F but may also be $CF_3$, and where $R^{10}$ is a pendant group which includes a group according to the formula $-SO_2X$ wherein X is selected from F, Cl, Br, I, or $-OH$. X is most typically F. In an alternative embodiment, pendant groups may be added to the backbone by grafting. Typically, pendant groups $R^{10}$ are highly fluorinated and more typically perfluorinated. $R^{10}$ may be aromatic or non-aromatic. Typically, $R^{10}$ is $-R^{11}-SO_2X$, where $R^{11}$ is a branched or unbranched perfluoroalkyl or perfluoroether group comprising 1–15 carbon atoms and 0–4 oxygen atoms. $R^{11}$ is typically $-O-R^{12}-$ wherein $R^{12}$ is a branched or unbranched perfluoroalkyl or perfluoroether group comprising 1–15 carbon atoms and 0–4 oxygen atoms. $R^{11}$ is more typically $-O-R^{13}-$ wherein $R^{13}$ is a perfluoroalkyl group comprising 1–15 carbon atoms. Examples of $R^{11}$ include:

$-(CF_2)_n-$ where n is 1, 2, 3, 4, 5, 6, 7, 8, 9, 10, 11, 12, 13, 14 or 15

$(-CF_2CF(CF_3)-)_n$ where n is 1, 2, 3, 4, or 5

$(-CF(CF_3)CF_2-)_n$ where n is 1, 2, 3, 4, or 5 $(-CF_2CF(CF_3)-)_n-CF_2-$ where n is 1, 2, 3 or 4

$(-O-CF_2CF_2-)_n$ where n is 1, 2, 3, 4, 5, 6 or 7

$(-O-CF_2CF_2CF_2-)_n$ where n is 1, 2, 3, 4, or 5

$(-O-CF_2CF_2CF_2CF_2-)_n$ where n is 1, 2 or 3

$(-O-CF_2CF(CF_3)-)_n$ where n is 1, 2, 3, 4, or 5

$(-O-CF_2CF(CF_2CF_3)-)_n$ where n is 1, 2 or 3

$(-O-CF(CF_3)CF_2-)_n$ where n is 1, 2, 3, 4 or 5

$(-O-CF(CF_2CF_3)CF_2-)_n$ where n is 1, 2 or 3

$(-O-CF_2CF(CF_3)-)_n-O-CF_2CF_2-$ where n is 1, 2, 3 or 4

$(-O-CF_2CF(CF_2CF_3)-)_n-O-CF_2CF_2-$ where n is 1, 2 or 3

$(-O-CF(CF_3)CF_2-)_n-O-CF_2CF_2-$ where n is 1, 2, 3 or 4

$(-O-CF(CF_2CF_3)CF_2-)_n-O-CF_2CF_2-$ where n is 1, 2 or 3

$-O-(CF_2)_n-$ where n is 1, 2, 3, 4, 5, 6, 7, 8, 9, 10, 11, 12, 13 or 14

$R^{10}$ is typically $-O-CF_2CF_2CF_2CF_2-SO_2X$ or $-O-CF_2-CF(CF_3)-O-CF_2-CF_2-SO_2X$ and most typically $-O-CF_2CF_2CF_2CF_2-SO_2X$. The $-SO_2X$ group is most typically $-SO_2F$ during polymerization, i.e., X is F. The $-SO_2X$ group is typically converted to $-SO_3H$ at some point prior to use of the fluoropolymer as an polymer electrolyte. The fluoromonomer providing first side group $R^{10}$ may be synthesized by any suitable means, including methods disclosed in U.S. Pat. No. 6,624,328.

The polymer may be made by any suitable method, including emulsion polymerization, extrusion polymerization, polymerization in supercritical carbon dioxide, solution or suspension polymerization, and the like, including methods disclosed in U.S. patent application Ser. No. 10/697,768, filed Oct. 30, 2003 and references cited therein.

In one embodiment, most or all of the of the $-SO_2X$ groups included on pendent groups are in $-SO_2F$ form during polymerization and a portion of the $-SO_2F$ groups are then converted to $-SO_2Cl$ prior to crosslinking. Typically, between 1 and 50% of $-SO_2F$ groups are converted to $-SO_2Cl$. The degree of conversion may be selected so that the resulting crosslinked polymer will meet the hydration product and equivalent weight parameters described below when uncrosslinked sulfonyl groups are converted to sulfonic acid. $-SO_2F$ groups may be converted to $-SO_2Cl$ groups by any suitable method. In one such method, $-SO_2F$ groups are reduced to $-SO_2H$ by use of a suitable reducing agent, such as a hydrazine or mercaptan such as mercaptoethanol, and subsequently converted to $-SO_2Cl$ with a hypochloride or chlorine. In another such method, $-SO_2F$ groups may be converted to $-SO_2Cl$ groups by hydrolyzing the $-SO_2F$ groups to sulfonic acid and subsequently reacting with oxalyl chloride in dry toluene with pyridine catalyst. Alternately, the polymer provided may include $-SO_3H$ groups and a portion of the $-SO_3H$ groups are then converted to $-SO_2Cl$ prior to crosslinking. Typically, between 1 and 50% of $-SO_3H$ groups are converted to $-SO_2Cl$. The degree of conversion may be selected so that the resulting crosslinked polymer will meet the hydration product and equivalent weight parameters described below when uncrosslinked groups are converted to sulfonic acid. $-SO_3H$ groups may be converted to $-SO_2Cl$ groups by any suitable method. In one such method, $-SO_3H$ groups may be converted to $-SO_2Cl$ groups by reaction with oxalyl chloride in dry toluene with pyridine catalyst.

In one embodiment, the $-SO_2X$ groups included on pendent groups are in $-SO_2F$ form or $-SO_2H$ form (sulfinic acid) during polymerization; that is, the monomer mixture contains both sulfonyl fluoride functional monomers and sulfinic acid functional monomers. The proportions of monomers are selected so that the resulting crosslinked polymer will meet the hydration product and equivalent weight parameters described below when sulfonyl fluoride groups are converted to sulfonic acid, and so that the desired degree of crosslinking will be achieved when sulfinic acid groups are crosslinked. Prior to crosslinking, the —$SO_2H$ groups are converted to —$SO_2Cl$ by any suitable method. In one such method, —$SO_2H$ groups are converted to —$SO_2Cl$ with a hypochloride or chlorine.

In one embodiment, the —$SO_2X$ groups included on pendent groups are in —$SO_2F$ form or —$SO_2Cl$ form during polymerization; that is, the monomer mixture contains both sulfonyl fluoride functional monomers and sulfonyl chloride functional monomers. The proportions of monomers are selected so that the resulting crosslinked polymer will meet the hydration product and equivalent weight parameters described below when sulfonyl fluoride groups are converted to sulfonic acid, and so that the desired degree of crosslinking will be achieved when sulfonyl chloride groups are crosslinked.

In one embodiment of the present invention, the polymer is brought into contact with a crosslinking agent prior to crosslinking. Any suitable crosslinking agent may be used, such that it will react with at least two radicals generated by removal of —$SO_2Cl$ from a pendent group. Crosslinking agents which may be useful in the practice of the present invention may include polyaromatic species or polyvinyl species. Examples of crosslinking agents useful in the practice of the present invention include: diphenyl ethers, diphenoxy alkanes, diphenoxy ethers, diphenoxy polyethers, di-, tri- and tetraallyl species, and the like. The crosslinking agent and polymer may be mixed by any suitable method, including mixing in solution or suspension, kneading, milling, or the like. The crosslinking agent may be added in any suitable amount relative to the number of first pendent groups. If an excess of crosslinking agent is added, the excess may be removed after crosslinking. Alternately, if the crosslinking agent is added in a less than an equimolar amount, it is expected that only a portion of the crosslinks formed will be through molecules of the crosslinking agent.

In one embodiment of the present invention, the polymer or polymer/crosslinking agent blend is formed into a membrane prior to crosslinking. Any suitable method of forming the membrane may be used. The polymer is typically cast from a suspension or solution. Any suitable casting method may be used, including bar coating, spray coating, slit coating, brush coating, and the like. Alternately, the membrane may be formed from neat polymer in a melt process such as extrusion. After forming, the membrane may be annealed. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use.

In a further embodiment, the polymer may be imbibed into a porous supporting matrix prior to crosslinking, typically in the form of a thin membrane having a thickness of 90 microns or less, more typically 60 microns or less, and most typically 30 microns or less. Any suitable method of imbibing the polymer into the pores of the supporting matrix may be used, including overpressure, vacuum, wicking, immersion, and the like. The polymer becomes embedded in the matrix upon reaction of the amidine groups. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. Additional embodiments may be found in U.S. Pats. Nos. RE37,307, RE37,656, RE37,701, and 6,254,978, the disclosures of which are incorporated herein by reference.

The crosslinking reaction may be carried out by any suitable method. Typically, the reaction is accomplished by exposure to electromagnetic radiation, typically in the ultraviolet band, sufficient to produce the desired degree of crosslinking. Alternately, the polymer may be exposed to a radical initiator. Any suitable initiator may be used, such that it is adequate to produce the desired degree of crosslinking in the amount used. The radical initiator may be a thermal initiator or a photochemical initiator. Suitable initators may include dithionates such as sodium dithionate, peroxides, azo compounds, benzophenones, acetophenones, and the like. The crosslinking agent and polymer may be mixed by any suitable method, including mixing in solution or suspension, kneading, milling, or the like. Activation of the initiator may occur in whole or part during annealing of the membrane or may be carried out separately from any annealing step, by application of heat, light or both.

Without wishing to be bound by theory, it is believed that the sulfonyl chloride group is removed by application of electromagnetic radiation or a radical initiator leaving behind a radical which readily binds covalently to other polymer strands or to crosslinking agents to form crosslinks. The step of crosslinking the polymer may occur in whole or part during annealing of the membrane or may be carried out separately from any annealing step.

After crosslinking, the remaining sulfur-containing functions of the pendent groups may be converted to sulfonic acid form by any suitable process. Sulfonyl halide groups may be converted by hydrolysis. In one typical process, the polymer is immersed in an aqueous solution of a strong base and subsequently acidified. In one typical embodiment, a polymer membrane is immersed in 15% KOH in water at 80° C. for 1 hour, then washed twice in 20% nitric acid at 80° C., then boiled in deionized water twice.

The acid-functional pendant groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendant groups typically are present in an amount sufficient to result in an equivalent weight (EW) of less than 1200, more typically less than 1100, and more typically less than 1000, and more typically less than 900.

It will be understood that membranes made according to the method of the present invention may differ in chemical structure from those made by other methods, in the structure of crosslinks, the placement of crosslinks, the placement of acid-functional groups, and the like.

This invention is useful in the manufacture of polymer electrolyte membranes for use in electrolytic cells such as fuel cells.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a crosslinked polymer comprising the steps of:
   a) providing a polymer comprising first pendent groups which include a group according to the formula $-SO_2Cl$; and
   b) crosslinking said polymer by a process that comprises removal of the $-SO_2Cl$ group;

wherein said polymer additionally comprises second pendant groups which include a group according to the formula $-SO_2X'$ wherein each X' is independently selected from the group consisting of F and $-OH$;

wherein said method additionally comprises, after said step b), the step of:
   d) converting any remaining groups according to the formula $-SO_2X'$ to sulfonic acid groups.

2. A method of making a crosslinked polymer comprising the steps of:
   a) providing a polymer comprising first pendant groups which include a group according to the formula $-SO_2Cl$; and
   b) crosslinking said polymer by a process that comprises removal of the $-SO_2Cl$ group;

wherein step a) of providing a polymer comprises the steps of:
   e) providing a polymer comprising pendent groups which include a group according to the formula $-SO_2F$; and
   f) converting at least a portion of said $-SO_2F$ groups to $-SO_2Cl$.

3. A method of making a crosslinked polymer comprising the steps of:
   a) providing a polymer comprising first pendent groups which include a group according to the formula $-SO_2Cl$; and
   b) crosslinking said polymer by a process that comprises removal of the $-SO_2Cl$ group;

wherein step a) of providing a polymer comprises the steps of:
   e) providing a polymer comprising first pendent groups which include a group according to the formula $-SO_2H$ and second pendant groups which include a group according to the formula $-SO_2F$; and
   f) converting said $-SO_2H$ groups to $-SO_2Cl$.

4. The method according to claim 1 wherein the resulting polymer has an equivalent weight of less than 1200.

* * * * *

UNITED STATES PATENT AND TRADEMARK OFFICE
CERTIFICATE OF CORRECTION

| | | |
|---|---|---|
| PATENT NO. | : 7,112,614 B2 | |
| APPLICATION NO. | : 10/730238 | |
| DATED | : September 26, 2006 | |
| INVENTOR(S) | : Naiyong Jing | |

It is certified that error appears in the above-identified patent and that said Letters Patent is hereby corrected as shown below:

Column 1
Line 31; delete " pendant " and insert -- pendent -- therefore.

Column 3
Line 43; delete " pendant " and insert -- pendent -- therefore.
Line 47; delete " pendant " and insert -- pendent -- therefore.

Column 4
Line 18; delete " an " and insert -- a -- therefore.
Line 28; delete " of the of the " and insert -- of the -- therefore.

Column 6
Line 13; delete " initators " and insert -- initiators -- therefore.
Line 42; delete " an hydration" and insert -- a hydration -- therefore.

Column 7
Claim 1, Line 9 – 10;
      delete " pendant " and insert -- pendent -- therefore.
Claim 2, Line 19;
      delete " pendant " and insert -- pendent -- therefore.

UNITED STATES PATENT AND TRADEMARK OFFICE
CERTIFICATE OF CORRECTION

PATENT NO. : 7,112,614 B2
APPLICATION NO. : 10/730238
DATED : September 26, 2006
INVENTOR(S) : Naiyong Jing It is certified that error appears in the above-identified patent and that said Letters Patent is hereby corrected as shown below:

<u>Column 8</u>
Claim 3, Line 18;
    delete " pendant " and insert -- pendent -- therefore.

Signed and Sealed this

Seventeenth Day of July, 2007

JON W. DUDAS
*Director of the United States Patent and Trademark Office*